(12) United States Patent
Lechner

(10) Patent No.: US 11,482,128 B2
(45) Date of Patent: Oct. 25, 2022

(54) SIMULATING AIRCRAFT DATA FOR TACTICS TRAINING

(71) Applicant: The Boeing Company, Chicago, IL (US)

(72) Inventor: Rob J. Lechner, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 246 days.

(21) Appl. No.: 16/547,032

(22) Filed: Aug. 21, 2019

(65) Prior Publication Data

US 2021/0056861 A1 Feb. 25, 2021

(51) Int. Cl.
*G09B 9/00* (2006.01)
*G09B 9/44* (2006.01)

(52) U.S. Cl.
CPC .............. *G09B 9/003* (2013.01); *G09B 9/44* (2013.01)

(58) Field of Classification Search
CPC ............ G09B 9/00; G09B 9/003; G09B 9/44
See application file for complete search history.

(56) References Cited

U.S. PATENT DOCUMENTS

| | | | |
|---|---|---|---|
| 8,616,883 B2 | 12/2013 | Wokurka | |
| 8,616,884 B1 | 12/2013 | Lechner et al. | |
| 8,986,011 B1 | 3/2015 | Sowadski et al. | |
| 9,099,009 B2 | 8/2015 | Sowadski et al. | |
| 9,230,446 B1 | 1/2016 | Mendro et al. | |
| 9,368,043 B1 | 6/2016 | Wenger et al. | |
| 9,596,212 B2 | 3/2017 | Thilenius et al. | |
| 9,646,417 B1 | 5/2017 | Sowadski et al. | |
| 9,799,229 B2 | 10/2017 | Wokurka et al. | |
| 2014/0080099 A1 | 3/2014 | Sowadski et al. | |
| 2015/0260474 A1* | 9/2015 | Rublowsky | A63F 13/837 434/16 |
| 2016/0117946 A1 | 4/2016 | Mendro et al. | |
| 2016/0210871 A1 | 7/2016 | Wokurka et al. | |
| 2017/0294135 A1 | 10/2017 | Lechner | |
| 2018/0272221 A1* | 9/2018 | Sundararajan | A63B 69/3658 |
| 2018/0293909 A1 | 10/2018 | Lechner | |

OTHER PUBLICATIONS

Extended European Search Report dated Feb. 25, 2021 in corresponding European Application No. 20192219.2, 8 pages.

* cited by examiner

*Primary Examiner* — Timothy A Musselman
(74) *Attorney, Agent, or Firm* — MH2 Technology Law Group LLP

(57) ABSTRACT

A computer-implemented method includes receiving, via an airborne network and by a computing device associated with a live-force aircraft in a training environment, simulated data representing simulated attributes of an adversary aircraft, wherein the simulated data is packet based; and executing, by the computing device, one or more operations based on receiving the simulated data for creating a training simulation for the live-force aircraft, wherein the training simulation includes the adversary aircraft with the simulated attributes.

20 Claims, 6 Drawing Sheets

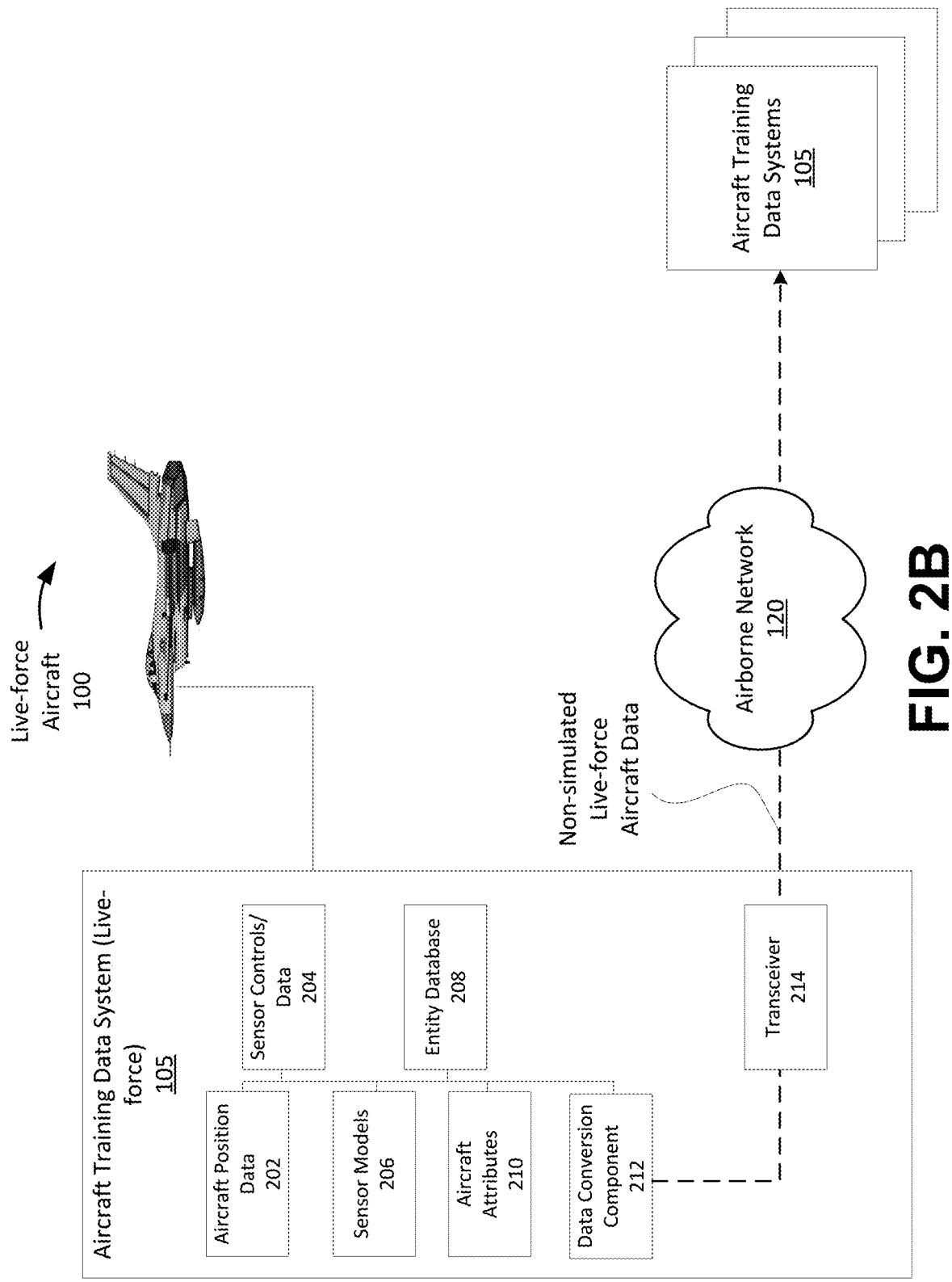

SIMULATING AIRCRAFT DATA FOR TACTICS TRAINING

BACKGROUND

In an aircraft tactics training environment, one or more "live force" aircraft are deployed in a training range (e.g., military range) with "adversary" aircraft as part of a training program for tactics training of pilots of the "live force" aircraft against the adversary aircraft. In some situations, the adversary aircraft used in a training program may include aircraft that is available in an inventory (e.g., older aircraft, decommissioned aircraft, unmanned aircraft, minimalistic aircraft, etc.). The adversary aircraft may not be representative (e.g., physically or in electronic spectrum) of what a live force pilot may face in a "real-life" combat scenario, as representative aircraft may not be available for training for a variety of reasons. The adversary aircraft may include a device to emit electromagnetic signals to allow the live force aircraft to detect and track the adversary aircraft.

SUMMARY

In one example aspect, a computer-implemented method includes receiving, via an airborne network and by a computing device associated with a live-force aircraft in a training environment, simulated data representing simulated attributes of an adversary aircraft, wherein the simulated data is packet based; and executing, by the computing device, one or more operations based on receiving the simulated data for creating a training simulation for the live-force aircraft, wherein the training simulation includes the adversary aircraft with the simulated attributes.

In another example aspect, there is a computer program product comprising a computer readable storage medium having program instructions embodied therewith. The program instructions are executable by a computing device to cause the computing device to: receive, via an airborne network and by a computing device associated with a live-force aircraft in a training environment, simulated data representing simulated attributes of an adversary aircraft, wherein the simulated data is packet based; and execute one or more operations based on receiving the simulated data for creating a training simulation for the live-force aircraft, wherein the training simulation includes the adversary aircraft with the simulated attributes.

In another example aspect, a system includes a processor, a computer readable memory and a computer readable storage medium associated with a computing device; program instructions to receive, via an airborne network and by a computing device associated with a live-force aircraft in a training environment, simulated data representing simulated attributes of an adversary aircraft, wherein the simulated data is packet based; and program instructions to execute one or more operations based on receiving the simulated data for creating a training simulation for the live-force aircraft, wherein the training simulation includes the adversary aircraft with the simulated attributes. The program instructions are stored on the computer readable storage medium for execution by the processor via the computer readable memory.

BRIEF DESCRIPTION OF THE DRAWINGS

FIGS. 2A and 2B illustrate example components and data flows between devices in the environment of FIG. 1.

DETAILED DESCRIPTION

Figure 1:
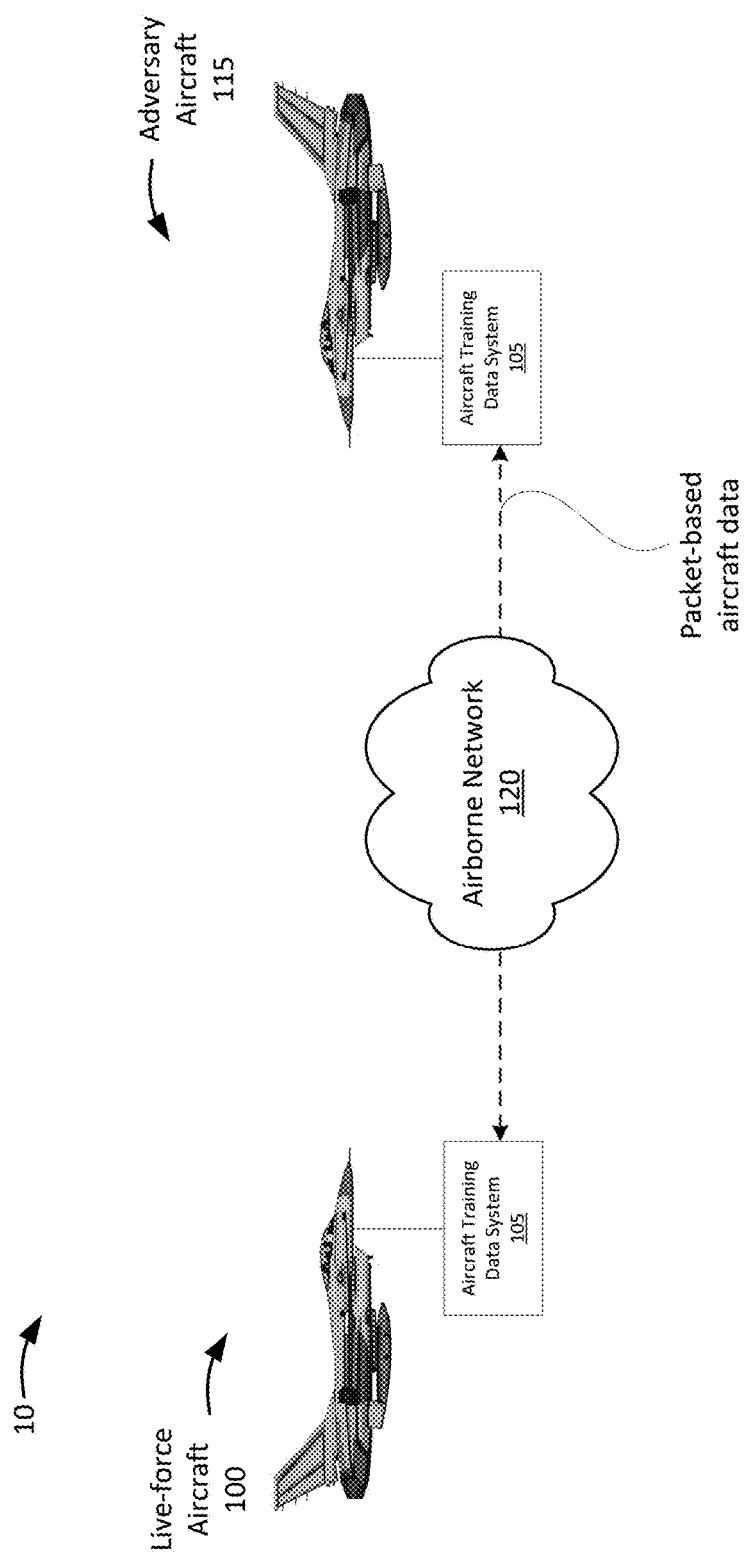
FIG. 1 shows an overview of an example environment and implementation as described herein.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

In aircraft tactics training between a "live force" aircraft (e.g., an aircraft that may be deployed in a live combat scenario) and "adversary aircraft," the adversary aircraft may not be representative (e.g., physically or in electronic spectrum) of what a live force pilot may face in a "real-life" combat scenario, as representative "real-life" adversary aircraft may not be available for training for a variety of reasons. For example, inexpensive, decommissioned, and/or other types of aircraft (e.g., beachcrafts, Leer jet, etc.) may be used as adversary aircraft in a training program. While using such types of aircraft may be useful when more representative real-life adversary aircraft are not available or unattainable, training using such types of non-representative adversary aircrafts may be less effective than if more representative or realistic adversary aircraft were used. For example, the non-representative adversary aircraft may appear differently in the electronic instrumentation of the live force aircraft. Also, electronic emissions, physical representations, heat signatures, and/or other types of signatures of the non-representative adversary aircraft may not accurately represent those of what a pilot may face in a real-life combat situation. Moreover, electronic emissions by the non-representative adversary aircraft may be detected by unauthorized observers. Accordingly, aspects of the present disclosure may replace the electronic emissions of the non-representative adversary aircraft with simulated packet-based adversary aircraft data in which the simulated adversary aircraft data more closely represents the attributes of a real-life adversary aircraft than that of the signals emitted by the non-representative adversary aircraft. That is aspects of the present disclosure may include a system to simulate attributes of a live adversary aircraft such that the adversary aircraft has the appearance (e.g., within instrumentation of the live-force aircraft) of a more realistic combat aircraft present in a real-life combat situation. In some embodiments, the simulated data may be generated as datagram or packets transmittable over a packet based airborne network.

As described herein. the simulated aircraft data may be transmitted to a live-force aircraft in a training environment such that the combat and/or electronic display systems of the live-force aircraft operate as if the adversary aircraft has the attributes of a real-life adversary aircraft. In this way, tactics development and tactical/combat training of a live-force pilot is improved, as the pilot has the opportunity to train against aircraft that appears to have the attributes of a real-life adversary aircraft that may be faced in a real-life combat situation. Further, relatively inexpensive, available, and relatively abundant, non-representative aircraft may still be used in a training program, as the non-representative aircraft may appear, in the instrumentation of live-force aircraft, to represent a real-life adversary aircraft.

In one or more embodiments, the simulated data may be packet-based data transmitted over a packet-based network (e.g., an Internet Protocol (IP) network, a local airborne network, or the like). The simulated data may be encrypted and the training network within which the simulated data is transmitted may be secured using any number of network security techniques (e.g., media access control filtering/blocking, firewalls, passwords, etc.). Additional security measures may be taken to safeguard encryption and decryption keys, and prevent unauthorized access to the training network (e.g., hardware encryption, using any class of encryptors). In this way, detection of training aircraft (e.g., live-force aircraft and/or adversary aircraft) by unauthorized parties is prevented.

As described herein, a live-force aircraft may receive sensor data in addition to the simulated data. In some embodiments, the sensor data may be inconsistent with the simulated data. For example, the sensor data may identify the actual or non-simulated attributes of adversary aircraft (e.g., size, dimensions, shape, heat signature, etc.), whereas the simulated data may identify the simulated attributes representing a realistic or simulated adversary aircraft. In some embodiments, the sensor data may be merged with the simulated data. The merged data may include a portion of the real sensor data, and a portion of simulated data to more closely resemble a real-life combat scenario. In this way, the simulated data may be used to "fill the gap" or supplement the sensor data to create a real-life combat scenario. Further, the systems of the live-force aircraft may execute and process instructions based on the merged data, giving the pilot a more realistic combat training environment. For example, the systems of the live-force aircraft may execute instructions to display the merged data, track the adversary aircraft based on the merged data, etc.

In one or more embodiments, the simulated data may be generated by an aircraft data system on board an adversary aircraft. In some embodiments, a portion of the simulated data may be based on real data (e.g., non-simulated data), such as the real geographic position of the adversary aircraft. That is, the simulated data may include the real position of the adversary aircraft, but simulated data regarding the adversary aircraft's heat signature, electronic emissions signature, physical properties (e.g., size, shape, dimensions, etc.), or the like. In some embodiments, an adversary aircraft may not necessarily be present, and a simulated training data application may be implemented on a computing device (e.g., a desktop, server, laptop, mobile device, augmented reality device, etc.). In this way, simulated training data may be generated and transmitted without the use an adversary aircraft. Upon receiving the simulated training data, the instrumentation systems of the live-force aircraft may detect simulated aircraft (e.g., the position, movements, and attributes of simulated aircraft) for the purposes of tactical aircraft training. In one or more alternative embodiments, simulated data may represent other types of vehicles other than aircraft, such as tanks or ground vehicles, structures, etc.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 shows an overview of an example implementation and an example environment in accordance with aspects of the present disclosure. As shown in FIG. 1, a training environment 10 may include a live-force aircraft 100, an adversary aircraft 115, and an airborne network 120. As described herein, the training environment may include any number of live-force aircrafts 100 and adversary aircrafts 115, however, for simplicity and illustrative purposes, one of each live-force aircraft 100 and adversary aircraft 115 is shown. As described herein, the adversary aircraft 115 may be non-representative of an adversary aircraft that may be present in a real-life combat situation, but is being used for training purposes due to availability.

As further shown in FIG. 1, each of the each live-force aircraft 100 and adversary aircraft 115 may include an aircraft training data system 105 whereby packet-based aircraft data may be exchanged via the airborne network 120. More specifically, the aircraft training data system 105 of the adversary aircraft 115 may transmit simulated aircraft data to the aircraft training data system 105 of the live-force aircraft 100. For example, the simulated aircraft data may represent the attributes of a real-life adversary aircraft that may be present in a live combat situation. As described herein, the aircraft training data system 105 of the live-force aircraft 100 may receive the simulated aircraft data and operate based on the simulated aircraft data (e.g., display the simulated aircraft data, operate weapons, navigations, and/or flight systems based on the simulated aircraft data, etc.). In this way, a pilot of the live-force aircraft 100 may experience a more realistic combat scenario during training programs.

In some embodiments, the aircraft training data system 105 of the live-force aircraft 100 may translate its actual (e.g., non-simulated) system, navigation, position, and/or sensor data into a packet-based format and transmit this packet-based aircraft data through the airborne network 120 for receipt by the aircraft training data system 105 of the adversary aircraft 115. Additionally, or alternatively, the packet-based aircraft data transmitted by the live-force aircraft 100 may be received by other aircraft and/or other computing devices connected to the airborne network 120. In this way aircraft data (e.g., both simulated and non-simulated aircraft data) may be transmitted and communicated across the airborne network 120 without the risk of the data being intercepted by unauthorized parties, which may be possible in systems in which the adversary aircraft 115 implements emitters for detection by the live-force aircraft 100. Also, by transmitting aircraft data in the form of packet-based data, multiple different aircraft and computing devices on the airborne network 120 may each discover and observe the aircraft data in a secure manner.

The airborne network 120 may include network nodes, and network devices to form a network (e.g., an Packet based network via which multiple different aircraft training data systems 105 and other computing devices may communicate. Additionally, or alternatively, the airborne network 120 may include one or more wired and/or wireless networks. For example, the airborne network 120 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the airborne network 120 may include copper transmission cables, optical transmission fibers, wireless transmission, routers, firewalls, switches, gateway computers and/or edge servers.

The quantity of devices and/or networks in the environment 10 is not limited to what is shown in FIG. 1. In practice, the environment 10 may include additional devices, aircraft, and/or networks; fewer devices and/or networks; different devices and/or networks; or differently arranged devices and/or networks than illustrated in FIG. 1. Also, in some implementations, one or more of the devices of the environment 10 may perform one or more functions described as being performed by another one or more of the devices of the environment 10. Devices of the environment 10 may interconnect via wired connections, wireless connections, or a combination of wired and wireless connections.

Figure 2A:
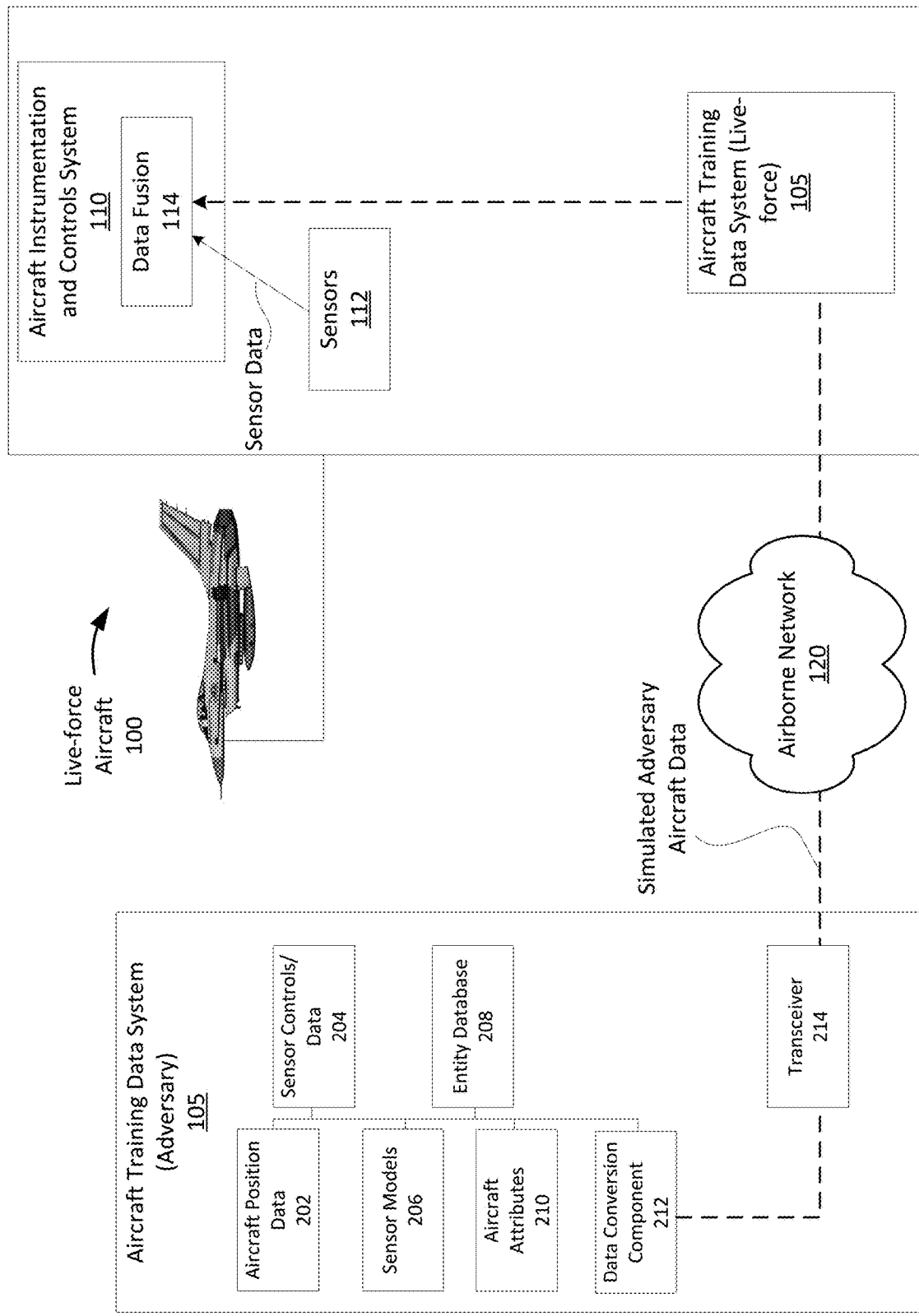

FIGS. 2A and 2B illustrates example components and data flows between devices in environment 10 of FIG. 1. More specifically, FIG. 2A illustrates example components for generating a simulated training environment by communicating packet-based simulated aircraft data between aircraft across an airborne network 120. As described herein, simulated aircraft data may be converted into a packet-based format and received by a live-force aircraft 100 for during a training operation.

As shown in FIG. 2A, an adversary aircraft training data system 105 may transmit simulated adversary aircraft data to a live-force aircraft training data system 105. In some embodiments, the adversary aircraft training data system 105 may be implemented in a live adversary aircraft 115. Additionally, or alternatively, the adversary aircraft training data system 105 may be implemented in a ground-based or non-aircraft computer system. The adversary aircraft training data system 105 may generate the simulated adversary aircraft data based on aircraft position data 202, sensor controls/data 204, sensor models 206, entity database 208, and/or aircraft attributes 210. In embodiments, a data conversion component 212 may be implemented to convert the data from the aircraft position data 202, sensor controls/data 204, sensor models 206, entity database 208, and/or aircraft attributes 210 into packet-based data for transmission via the airborne network 120.

In some embodiments, the aircraft position data 202 may be based on non-simulation data of a live adversary aircraft 115. For example, when the adversary aircraft training data system 105 is implemented in a live adversary aircraft 115, the aircraft position data 202 may be obtained from aircraft navigational/positional devices that track the real-time position of the live adversary aircraft 115. Alternatively, when the adversary aircraft training data system 105 is implemented in a non-aircraft computing system, the aircraft position data 205 may be simulated.

In some embodiments, the sensor controls/data 204 may include non-simulated sensor and control data from sensors implemented on a live adversary aircraft 115, or simulated sensor and control data when the aircraft training data system 105 is implemented on a non-aircraft training system. In some embodiments, the sensor control may be on board the live adversary aircraft 115, or remote controlled (e.g., wirelessly remote controlled from a cockpit of the live adversary aircraft 115). In some embodiments, the sensor data may be received the adversary aircraft 115 or remote received (e.g., from a ground system or airborne system). The sensor models 206 may include any number of modeled sensor data, including threat awareness data, RADAR data, Radar Warning Receive (RWR) data, etc.

In some embodiments, the entity database 208 may store data identifying other entities (e.g., aircraft, structures, vehicles, etc.) detected within the airborne network 120. The aircraft attributes 210 may include simulated attributes of an aircraft that may resemble a real-life combat aircraft. For example, the aircraft attributes 210 may identify an aircraft type, model, dimensions, size, shape, design, etc. Additionally, or alternatively, the aircraft attributes may identify electronic emissions signatures, heat signatures, or the like. In some embodiments, the aircraft attributes 210 may be provided via user input (e.g., by an operator or training personnel). For example, the aircraft attributes 210 may be set to resemble a particular type of aircraft to train against.

In some embodiments, a data conversion component 212 may convert and package data from the aircraft position data 202, sensor controls/data 204, sensor models 206, entity database 208, and/or aircraft attributes 210 into simulated adversary aircraft data. The simulated adversary aircraft data may be transmitted to other devices on the airborne network 120 (e.g., via a transceiver 214). In the example of FIG. 2A, the simulated adversary aircraft data may be transmitted to a live-force aircraft training data system 105.

In some embodiments, the live-force aircraft training data system 105 may provide the simulated adversary aircraft data to an aircraft instrumentation and controls system 110. As shown in FIG. 2A, the aircraft instrumentation and controls system 110 may also receive data from sensors 112 implemented on the live-force aircraft 100. As described herein, a portion of the data from the sensors 112 may conflict or be inconsistent with the simulated adversary aircraft data. For example, the sensor data may identify the actual or non-simulated attributes of adversary aircraft (e.g., size, dimensions, shape, heat signature, etc.), whereas the simulated data may identify the simulated attributes representing a realistic or simulated adversary aircraft. To account for these inconsistencies, the aircraft instrumentation and controls system 110 may implement data fusion 114 to fuse or merge the sensor data with the simulated adversary aircraft data. In some embodiments, the data fusion 114 may filter, discard, and/or override a portion of the conflicting sensor data such that the aircraft instrumentation and controls system 110 receives the simulated data. In general, the data fusion 114 may retain sensor data that does not conflict with the simulated adversary aircraft data, and may override sensor data that conflicts with the simulated adversary aircraft data. In this way, the aircraft instrumentation and controls system 110 may receive a complete set of merged data that includes non-conflicting sensor data as well as simulated adversary aircraft data to create the "appearance" and simulated scenario of a realistic adversary aircraft that may be present in a combat scenario. In some embodiments, any number of rules may be implemented to define the manner in which the data fusion 114 is to modify, filter, and/or override the sensor data with consideration to the simulated aircraft data.

Based on receiving the merged data, the aircraft instrumentation and controls system 110 may execute any number of instructions or operations based on the merged data. For example, the aircraft instrumentation and controls system 110 may display the merged data such that live adversary aircraft 115 has the attributes (e.g., appearance, electronic emissions signature, heat signature, etc.) of a realistic adversary aircraft. Further, any combat tactics, weapons systems, and/or maneuvers controlled by the aircraft instrumentation and controls system 110 (e.g., automatically or manually) may be executed based on the simulated attributes and simulated data. In this way, aircraft tactics training may more realistically reassembled a real-life combat scenario.

Figure 3:
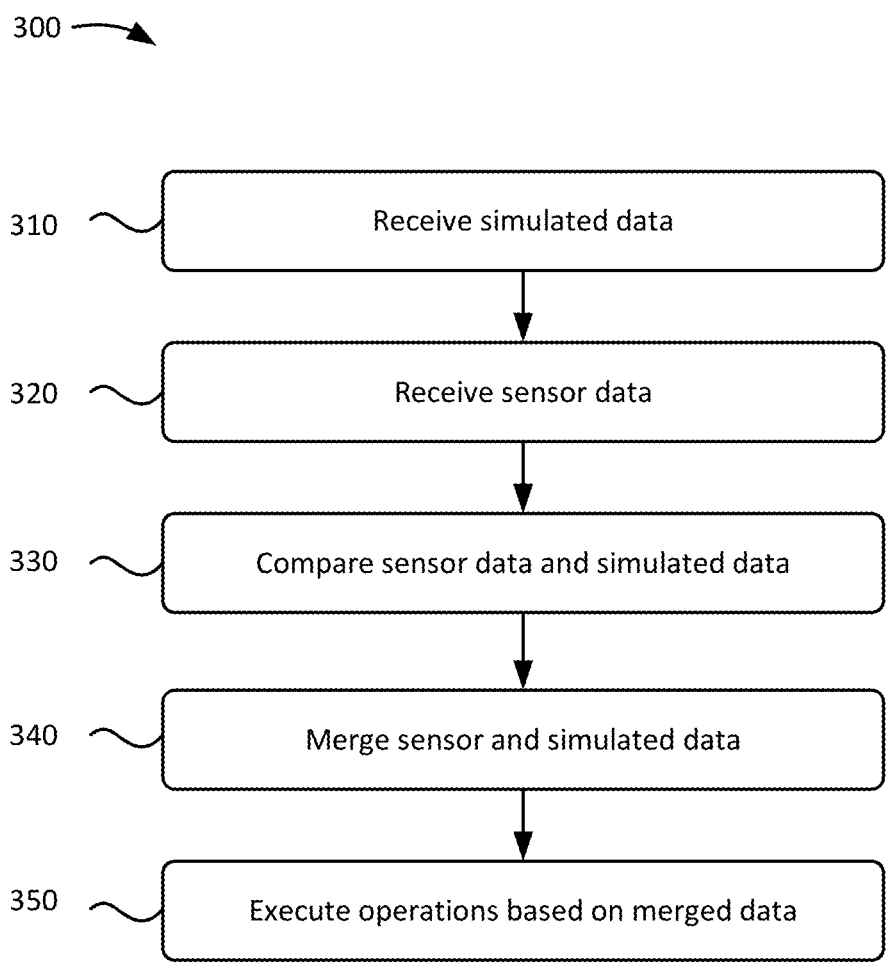
FIG. 3 shows an example flowchart of a process for receiving and using simulated aircraft data for realistic aircraft tactics training.

As described herein, in addition to receiving pack-based simulated aircraft data, the live-force aircraft 100 may also generate and transmit non-simulated aircraft data to other aircraft data systems 105 in the airborne network 120 (e.g., implemented either in other aircraft or ground systems). In this way, the analytics data from the live-force aircraft 100 may be received and used as part of training or analysis. For example, referring to FIG. 2B, a live-force aircraft training data system 105 may generate packet-based non-simulated live force aircraft data in a similar manner as simulated adversary aircraft is generated by an adversary aircraft training data system 105 as discussed in FIG. 2A. For example, the live-force aircraft training data system 105 may convert aircraft position data 202, sensor controls/data 204, sensor models 206, entity database 208, and/or aircraft attributes 210 into packet-based data for transmission via the airborne network 120. As shown in FIG. 2B, multiple different aircraft training data systems 105 may receive the non-simulated live-force aircraft data. The non-simulated live-force aircraft data may be received and used by other live-force aircraft 100 and/or by live adversary aircraft 115 (e.g., for displaying the non-simulated live-force aircraft data in instrumentation/display systems, etc.). Additionally, or alternatively, the non-simulated live-force aircraft data may be stored for analysis at a later time. In some embodiments, a centralized server receive simulated and/or non-simulated aircraft data for dissemination, or each individual aircraft training data system 105 may receive simulated and/or non-simulated aircraft data FIG. 3 shows an example flowchart of a process for receiving and using simulated aircraft data for realistic aircraft tactics training. The steps of FIG. 3 may be implemented in the environment of FIG. 1, for example, and are described using reference numbers of elements depicted in FIG. 1. The flowchart illustrates the architecture, functionality, and operation of possible implementations of systems, methods, and computer program products according to various embodiments of the present disclosure. In some embodiments, process 300 may be executed or performed by an aircraft training data system 105.

As shown in FIG. 3, process 300 may include receiving simulated data (block 310). For example, the aircraft training data system 105 (e.g., implemented in a live-force aircraft 100) may receive simulated data from another aircraft training data system 105 connected to the airborne network 120 (e.g., an aircraft training data system 105 implemented by a live adversary aircraft, a remote or ground-based aircraft training data system 105, etc.). As described herein, the simulated data may represent simulated attributes of live adversary aircraft and/or attributes of simulated adversary aircraft.

Process 300 may also include receiving sensor data (block 320). For example, the aircraft training data system 105 may receive sensor data from one or more sensors 112 implemented by the live-force aircraft 100. In some embodiments, the sensor data may be non-simulated sensor readings representing attributes of surrounding live adversary aircraft (e.g., electronic emissions data, electronic signature data, heat signature data, aircraft size, shape, dimensions, etc.).

Process 300 may further include comparing the sensor data and the simulated data (block 330). For example, the aircraft training data system 105 may compare the sensor data (e.g., non-simulated data) with the simulated data. From the comparison, the aircraft training data system 105 may identify inconsistences or differences between the sensor data and the simulated data. For example, the sensor data may identify the actual or non-simulated attributes of adversary aircraft (e.g., size, dimensions, shape, heat signature, etc.), whereas the simulated data may identify the simulated attributes representing a realistic or simulated adversary aircraft.

Process 300 may also include merging the sensor and simulated data (block 340). For example, the aircraft training data system 105 may merge the sensor and simulated data (e.g., using data fusion 114). In some embodiments, the data fusion 114 may filter, discard, and/or override a portion of the conflicting sensor data such that an aircraft instrumentation and controls system 110 of the aircraft training data system 105 receives the simulated data. In general, the data fusion 114 may retain sensor data that does not conflict with the simulated adversary aircraft data, and may override sensor data that conflicts with the simulated adversary aircraft data. In this way, the aircraft instrumentation and controls system 110 may receive a complete set of merged data that includes non-conflicting sensor data as well as simulated adversary aircraft data to create the "appearance" and simulated scenario of a realistic adversary aircraft that may be present in a combat scenario. In some embodiments, any number of rules may be implemented to define the manner in which the data fusion 114 is to modify, filter, and/or override the sensor data with consideration to the simulated aircraft data. In this way, a representation of the live adversary aircraft may be digitally transformed (e.g., from the point of view of the instrumentation in the live-force aircraft) into a realistic combat adversary aircraft (e.g., an aircraft having the simulated attributes consistent with attributes of an aircraft present in a combat situation). That is, the simulated data may transform a digital representation of the live adversary aircraft such that the live adversary aircraft has the attributes (e.g., appearance, heat signature, electronic signature, size, shape, dimensions, etc.) of a realistic combat adversary aircraft.

Process 300 may further include executing operations based on the merged data (block 350). For example, the aircraft instrumentation and controls system 110 of the aircraft training data system 105 may execute any number of instructions or operations based on the merged data. For example, the aircraft instrumentation and controls system 110 may display the merged data such that a digital representation of the live adversary aircraft 115 has the attributes (e.g., appearance, electronic emissions signature, heat signature, etc.) of a realistic combat adversary aircraft. Further, any combat tactic operations, weapons system operations, instrumentation displays, and/or maneuvering operations controlled by the aircraft instrumentation and controls system 110 (e.g., automatically or manually) may be executed and/or modified based on the simulated attributes and simulated data. In this way, an aircraft tactics training simulation is created in which the simulation may more realistically reassembled a real-life combat scenario in relation to when the training environment includes only a non-representative adversary aircraft.

In some embodiments, the aircraft training data system 105 may translate live-force aircraft data of the live force aircraft 100 into data transmittable via an IP network (e.g., the airborne network 120). For example, the aircraft training data system 105 may translate live-force aircraft data, such as sensor readings, position, speed, trajectory, mission and aircraft commands, etc. into packetized data for transmission to other aircraft training data systems 105 throughout the airborne network 120. In this way, the operations of the live-force aircraft 100 may be seen and observed by other computing devices, simulators, and/or other aircraft training data systems 105 on the airborne network 120). Also, since aircraft data is transmitted via a secure airborne network 120 versus through electronic emission signals, the aircraft data may not be accessible by unauthorized parties.

Figure 4:
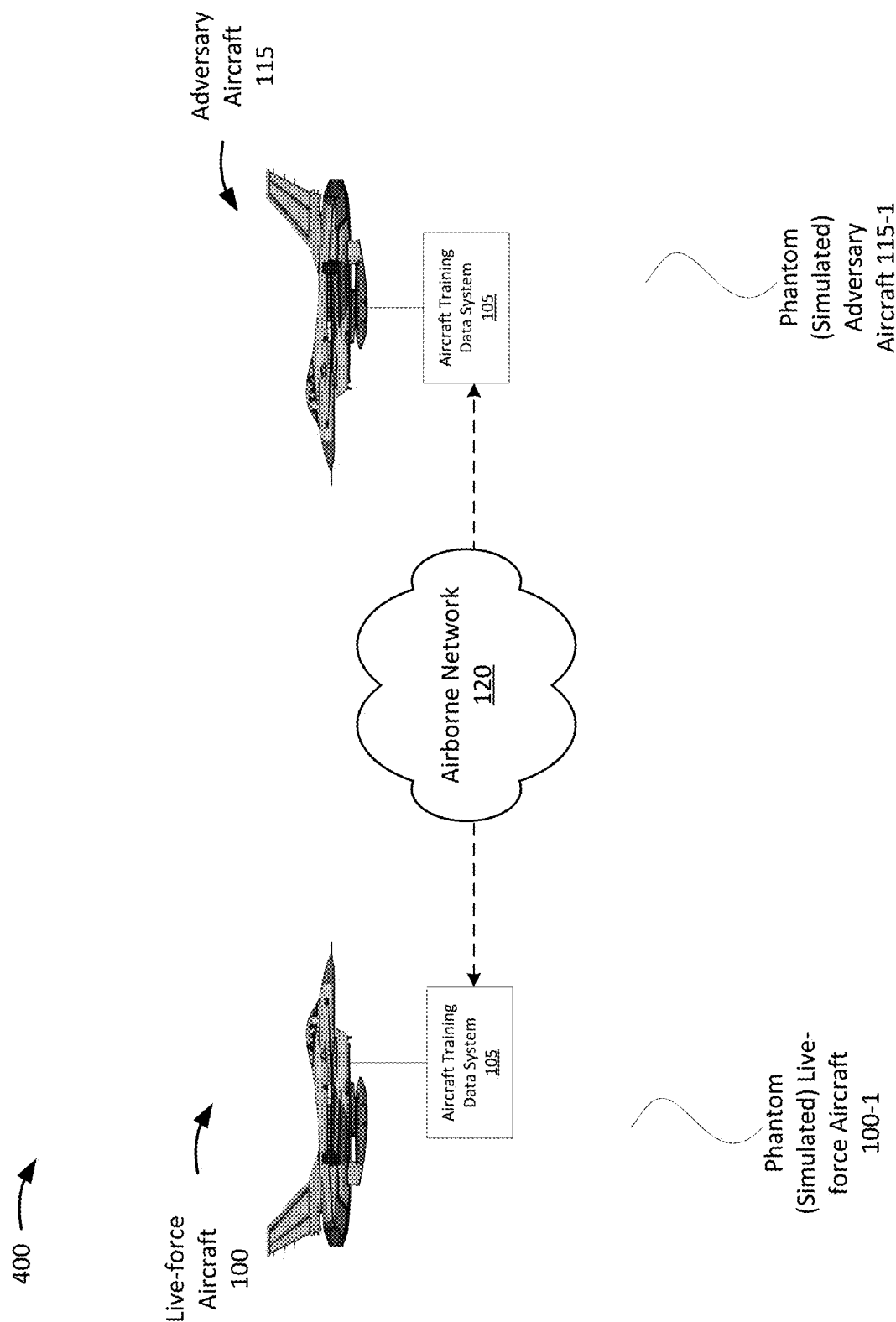
FIG. 4 shows an example training environment in accordance with aspects of the present disclosure.

FIG. 4 shows an example training environment in accordance with aspects of the present disclosure. As shown in FIG. 4, a training environment 400 may include a live-force aircraft 100 and an adversary aircraft 115. The adversary aircraft 115 may be a live, non-simulated aircraft, but may implement an aircraft training data system 105 to simulate one or more of its attributes such that the adversary aircraft 115 has the appearance (e.g., within instrumentation of the live-force aircraft 100) of a more realistic combat aircraft present in a real-life combat situation. As further shown in FIG. 4, the training environment 400 may further include phantom or simulated live-force aircraft 100-1, and phantom or simulated adversary aircraft 115-1. In some embodiments, phantom aircraft may not be physically present, but may appear within a display and/or other instrumentation systems of the live-force aircraft 100. Phantom aircraft may be generated by any aircraft training data system 105 on the airborne network 120. For example, a training aircraft training data system 105 may generate simulated packetized aircraft data, and transmit the data over the airborne network 120 as IP data. Additionally, or alternatively, the phantom live-force aircraft 100-1 and/or the phantom adversary aircraft 115-1 may be simulated aircraft that is being controlled by an individual using a ground-based aircraft simulator. That is, the phantom aircraft may be purely simulated and computer-controlled, or may be simulated and operator controlled. In this way, the training environment 400 may include any number of live aircraft with simulated attributes and/or simulated phantom aircraft for creating a variety of training simulations. Further, any number of operations may be executed based on the simulated data included in the training environment 400 (e.g., operations to adjust digital representations of live and/or phantom adversary aircrafts, adjusting combat operations by the live-force aircraft 100, etc.).

Figure 5:
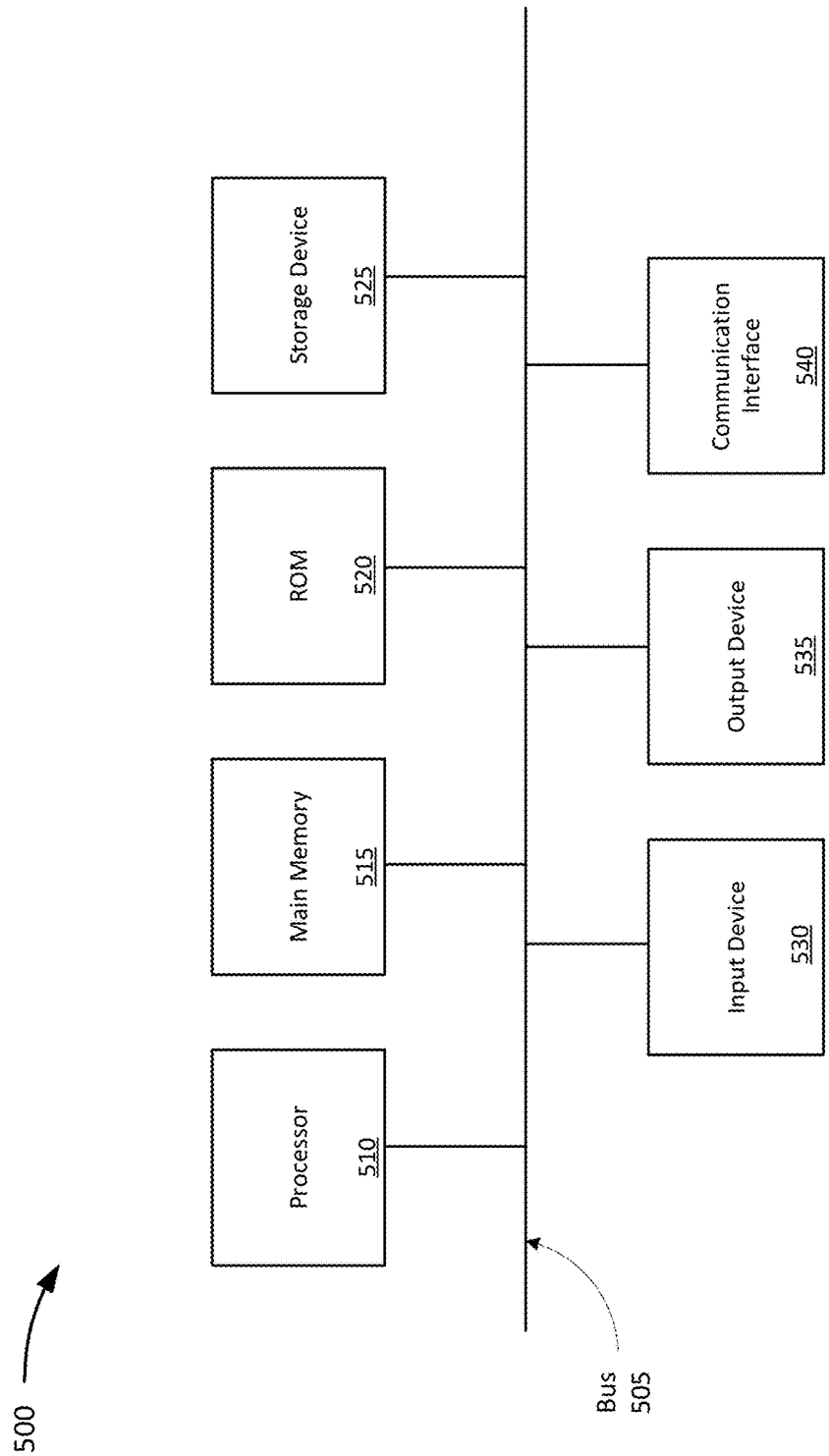
FIG. 5 illustrates example components of a device that may be used within training environments.

FIG. 5 illustrates example components of a device 500 that may be used within training environments 10 or 400. In some embodiments, device 500 may correspond to the aircraft training data system 105, the aircraft instrumentation and controls system 110, and/or any types of computing devices implemented by the live-force aircraft 100. Each of the aircraft training data system 105, the aircraft instrumentation and controls system 110 may include one or more devices 500 and/or one or more components of device 500.

As shown in FIG. 5, device 500 may include a bus 505, a processor 510, a main memory 515, a read only memory (ROM) 520, a storage device 525, an input device 530, an output device 535, and a communication interface 540.

Bus 505 may include a path that permits communication among the components of device 500. Processor 510 may include a processor, a microprocessor, an application specific integrated circuit (ASIC), a field programmable gate array (FPGA), or another type of processor that interprets and executes instructions. Main memory 515 may include a random access memory (RAM) or another type of dynamic storage device that stores information or instructions for execution by processor 510. ROM 520 may include a ROM device or another type of static storage device that stores static information or instructions for use by processor 510. Storage device 525 may include a magnetic storage medium, such as a hard disk drive, or a removable memory, such as a flash memory.

Input device 530 may include a component that permits an operator to input information to device 500, such as a control button, a keyboard, a keypad, or another type of input device. Output device 535 may include a component that outputs information to the operator, such as a light emitting diode (LED), a display, or another type of output device. Communication interface 540 may include any transceiver-like component that enables device 500 to communicate with other devices or networks. In some implementations, communication interface 540 may include a wireless interface, a wired interface, or a combination of a wireless interface and a wired interface. In embodiments, communication interface 540 may receiver computer readable program instructions from a network and may forward the computer readable program instructions for storage in a computer readable storage medium (e.g., storage device 525).

Device 500 may perform certain operations, as described in detail below. Device 500 may perform these operations in response to processor 510 executing software instructions contained in a computer-readable medium, such as main memory 515. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 515 from another computer-readable medium, such as storage device 525, or from another device via communication interface 540. The software instructions contained in main memory 515 may direct processor 510 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 500 may include additional components, fewer components, different components, or differently arranged components than are shown in FIG. 5.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   receiving, via an airborne network and by a computing device associated with a live-force aircraft in a training environment, simulated data representing simulated attributes of an adversary aircraft, wherein the simulated data is packet based, wherein the simulated attributes comprise one or more of an appearance, an electronic emissions signature, a heat signature, or combinations thereof of a realistic adversary aircraft;
   receiving sensor data from the live-force aircraft;

merging the sensor data with the simulated data based on differences between the sensor data and the simulated data to produce merged sensor and simulated data, wherein the merged sensor and simulated data comprises overwritten sensor data that conflicts with the simulated data, added simulated data that is missing from the sensor data, or both; and executing, by the computing device, one or more operations based on receiving the merged sensor and simulated data for creating a training simulation for the live-force aircraft, wherein the training simulation includes the adversary aircraft with the simulated attributes.

2. The method of claim 1, wherein the executing the one or more operations comprises at least one of:
displaying a digital representation of the adversary aircraft with the simulated attributes with the merged sensor and simulated data;
adjusting instrumentation displays based on the merged sensor and simulated data;
adjusting combat tactic operations based on the merged sensor and simulated data;
adjusting weapons system operations based on the merged sensor and simulated data; and
adjusting maneuvering operations based on the merged sensor and simulated data.

3. The method of claim 1, wherein the adversary aircraft is a live adversary aircraft, wherein the merged sensor and simulated data transforms a digital representation of the live adversary aircraft into a combat adversary aircraft having the simulated attributes.

4. The method of claim 1, further comprising receiving additional simulated data representing phantom or simulated adversary aircraft, wherein the additional simulated data is remotely received from a ground or airborne system, and wherein executing the one or more operations is based on receiving the additional simulated data.

5. The method of claim 1, further comprising transmitting packetized data representing operations of the live-force aircraft across the airborne network.

6. The method of claim 1, wherein the airborne network is an IP based or other packet-based network.

7. The method of claim 1, further comprising displaying the one or more of the appearance, the electronic emissions signature, the heat signature, or combinations thereof of the realistic adversary aircraft.

8. A computer program product comprising a computer readable storage medium having program instructions embodied therewith, the program instructions being executable by a computing device to cause the computing device to:
receive, via an airborne network and by a computing device associated with a live-force aircraft in a training environment, simulated data representing simulated attributes of an adversary aircraft, wherein the simulated data is packet based, wherein the simulated attributes comprise one or more of an appearance, an electronic emissions signature, a heat signature, or combinations thereof of a realistic adversary aircraft;
receiving sensor data from the live-force aircraft;
merging the sensor data with the simulated data based on differences between the sensor data and the simulated data to produce merged sensor and simulated data, wherein the merged sensor and simulated data comprises overwritten sensor data that conflicts with the simulated data, added simulated data that is missing from the sensor data, or both; and
execute one or more operations based on receiving the merged sensor and simulated data for creating a training simulation for the live-force aircraft, wherein the training simulation includes the adversary aircraft with the simulated attributes.

9. The computer program product of claim 8, wherein the executing the one or more operations comprises at least one of:
displaying a digital representation of the adversary aircraft with the simulated attributes with the merged sensor and simulated data;
adjusting instrumentation displays based on the merged sensor and simulated data;
adjusting combat tactic operations based on the merged sensor and simulated data;
adjusting weapons system operations based on the merged sensor and simulated data; and
adjusting maneuvering operations based on the merged sensor and simulated data.

10. The computer program product of claim 8, wherein the adversary aircraft is a live adversary aircraft, wherein the merged sensor and simulated data transforms a digital representation of the live adversary aircraft into a combat adversary aircraft having the simulated attributes.

11. The computer program product of claim 8, wherein the program instructions further cause the computing device to receive additional simulated data representing phantom or simulated adversary aircraft, wherein the executing the one or more operations is based on receiving the additional simulated data.

12. The computer program product of claim 8, wherein the program instructions further cause the computing device to transmit packetized data representing operations of the live-force aircraft across the airborne network.

13. The computer program product of claim 8, wherein the airborne network is an IP based or other packet-based network.

14. The computer program product of claim 8, further comprising displaying the one or more of the appearance, the electronic emissions signature, the heat signature, or combinations thereof of the realistic adversary aircraft.

15. A system comprising:
a processor, a computer readable memory and a computer readable storage medium associated with a computing device;
program instructions to receive, via an airborne network and by a computing device associated with a live-force aircraft in a training environment, simulated data representing simulated attributes of an adversary aircraft, wherein the simulated data is packet based and the simulated attributes comprise one or more of an appearance, an electronic emissions signature, a heat signature, or combinations thereof of a realistic adversary aircraft;
program instructions to receive sensor data from the live-force aircraft;
program instructions to merge the sensor data with the simulated data based on differences between the sensor data and the simulated data to produce merged sensor and simulated data, wherein the merged sensor and simulated data comprises overwritten sensor data that conflicts with the simulated data, added simulated data that is missing from the sensor data, or both; and
program instructions to execute one or more operations based on receiving the merged sensor and simulated data for creating a training simulation for the live-force aircraft, wherein the training simulation includes the adversary aircraft with the simulated attributes, wherein the program instructions are stored on the computer readable storage medium for execution by the processor via the computer readable memory.

16. The system of claim 15, wherein the executing the one or more operations comprises at least one of:
displaying a digital representation of the adversary aircraft with the simulated attributes with the merged sensor and simulated data;
adjusting instrumentation displays based on the merged sensor and simulated data;
adjusting combat tactic operations based on the merged sensor and simulated data;
adjusting weapons system operations based on the merged sensor and simulated data; and
adjusting maneuvering operations based on the merged sensor and simulated data.

17. The system of claim 15, wherein the adversary aircraft is a live adversary aircraft, wherein the merged sensor and simulated data transforms a digital representation of the live adversary aircraft into a combat adversary aircraft having the simulated attributes.

18. The system of claim 15, further comprising program instructions to receive additional simulated data representing phantom or simulated adversary aircraft, wherein the executing the one or more operations is based on receiving the additional simulated data.

19. The system of claim 15, further comprising program instructions to transmit packetized data representing operations of the live-force aircraft across the airborne network.

20. The system of claim 15, further comprising program instructions to display the one or more of the appearance, the electronic emissions signature, the heat signature, or combinations thereof of the realistic adversary aircraft.

* * * * *